(No Model.) 2 Sheets—Sheet 2.

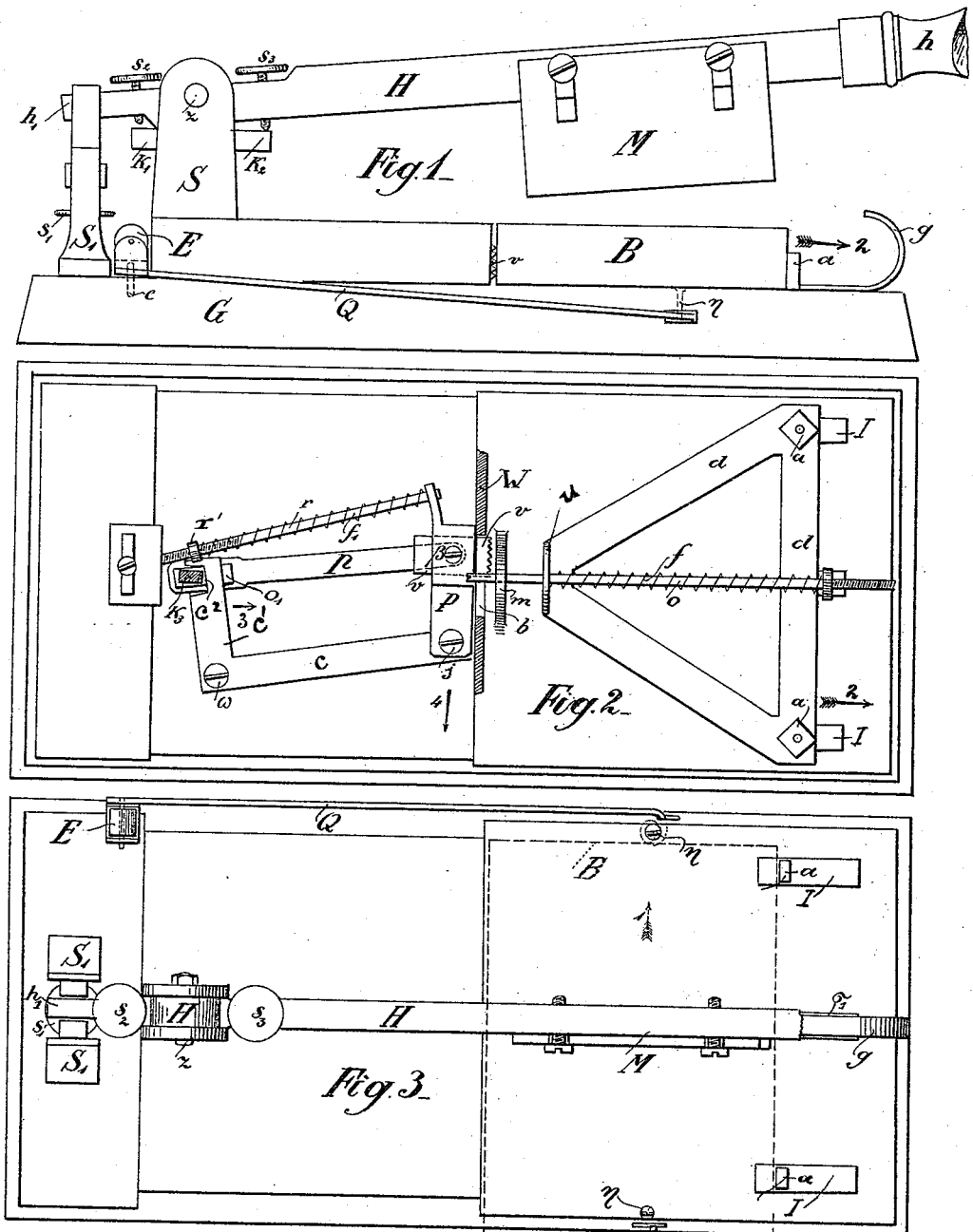

J. VRÁTIL.
SLICING OR CHOPPING MACHINE.

No. 441,081. Patented Nov. 18, 1890.

Witnesses:
Adebos.
E. L. Richards

Inventor:
Jan Vrátil
By Richards
Attorneys.

UNITED STATES PATENT OFFICE.

JAN VRÁTIL, OF DOUDLEB, AUSTRIA-HUNGARY.

SLICING OR CHOPPING MACHINE.

SPECIFICATION forming part of Letters Patent No. 441,081, dated November 18, 1890.

Application filed May 14, 1889. Serial No. 310,705. (No model.)

*To all whom it may concern:*

Be it known that I, JAN VRÁTIL, a subject of the Emperor of Austria-Hungary, residing at Doudleb, Bohemia, Austria-Hungary, have invented certain new and useful Improvements in Slicing or Chopping Machines, of which the following is a full, clear, and exact description.

The object of this invention is a machine by which various articles can be sliced, as is necessary in culinary operations, such as dumplings and other articles of dough, sections and slices of fruit, vegetables, roots, &c. These the machine cuts automatically into pieces of equal thickness.

The machine is shown in the accompanying drawings.

Figure 4:
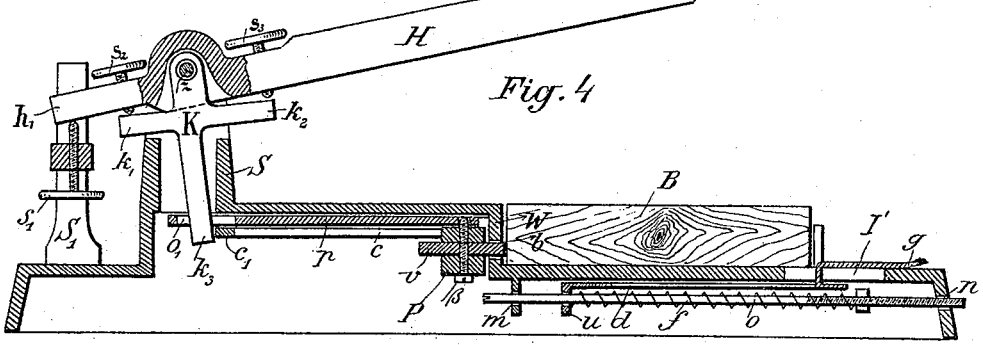
Figure 5:
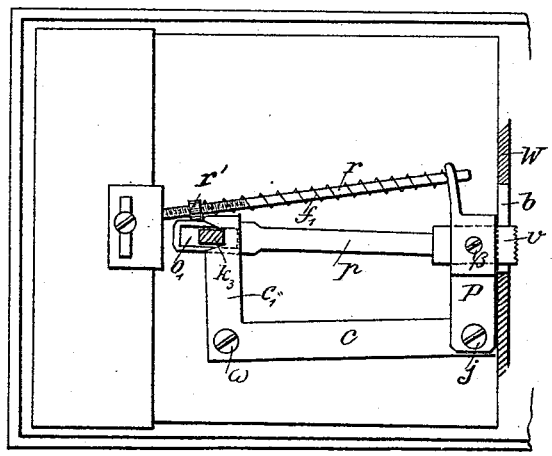
Figure 6:
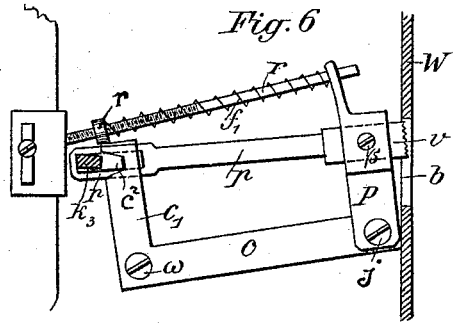
Figure 7:
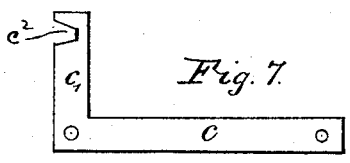
Figure 8:
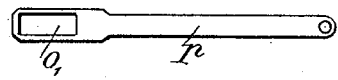

Figure 1 is a side elevation; Fig. 2, a view from beneath; Fig. 3, a view from above; Fig. 4, a longitudinal section. Fig. 5 is a bottom view of one end of the device. Fig. 6 is a similar view of the board-propelling mechanism in a different position. Fig. 7 is a plan view of the elbow-lever, and Fig. 8 is a plan view of the propeller arm or rod.

The article to be sliced is placed on the cutting-board B beneath the knife M, and through the raising and lowering of the knife the sliding board B and the article lying thereon are automatically moved forward in the direction of the arrow 1, Fig. 3. The oscillating lever H, fastened by a pivot $z$ in a hollow standard S, holds the removable knife M, (the blade of which may have any desired form, according to the shape that is required for the surface of the article to be sliced,) and the knife-holder is moved up and down by the handle $h$, (oscillating on the pivot $z$.) The amount of lift of the knife-holder is regulated by the adjustable screw $s'$, fixed in the forked standard S', against the point of which screw when the knife-holder is raised the short lever-arm $h'$ strikes. The farther the screw $s'$ is screwed in the smaller becomes the lifting-space of the oscillating lever H.

The article to be sliced lies on the board B beneath the knife M. The plate is held firm between two pins $a\ a$, which also serve as guides, and a rod $v$ for pushing it forward provided with projecting points in front. These pins $a\ a$ can be drawn back in the direction shown by arrow 2 in two slots I I in the bottom plate G by means of handle $g$, which can also be moved in the slot I'. The pins $a\ a$ are pushed back in the direction of arrow 2 by means of the handle $g$, in order to insert the board B easily. On releasing the handle $g$ the pins $a\ a$ spring against the board B by the pressure of a spiral spring $f$, and the board is then pressed (or clipped) on one side by these pins and on the other by the propelling-rod $v$.

The pins $a\ a$ and handle $g$ are firmly connected by a triangular frame $d$, lying under the bottom plate G, through the downward-bent part $u$ of which frame there runs a spindle $o$, mounted in the hangers $m$ and $n$, and provided with said spiral spring $f$. If the handle $g$ is drawn to the right, the triangle $d$ and the pins $a\ a$ are pushed in the same direction, the spring $f$ is compressed, and the board B can then be easily withdrawn. On the release of the handle $g$ the spiral spring $f$ again expands and the pins $a\ a$ spring back again. It is necessary now to give the board B an even forward motion from behind in the direction of arrow 1, which is done by means of the propelling-rod $v$, the projecting points of which press into the board B. On the pivot $z$ in the hollow standard S is hung a cross-arm lever K, which moves with it, and of which the long arm $k^3$ extends direct to the actual propelling mechanism. The cross-arm lever is, by the raising and lowering of the oscillating lever, moved backward and forward like a pendulum, as the screws $s^2\ s^3$ fixed in the oscillating lever press down alternately the arms $k'\ k^2$ of the cross-lever. If the screw $s^3$ strikes on the arm $k^2$, it turns the arm $k^3$ to the left, and if the screw $s^2$ strikes on the arm $k'$ it turns arm $k^3$ to the right.

The propelling apparatus consists of an arm $p$, situated under the bottom plate G, provided with a longitudinal slot $o'$ and with an elbow-lever $c\ c'$, moving on the pivot $w$. The arm $p$ is connected with a slide P, which contains the propeller $v$ and the parts $p$. P and $v$ are held together by the screw B. On the other side the lever $c$ is fastened by a screw $j$ to the slide P, so that if any one of these parts be moved all the others make a relative movement with it. The lever-arm $c'$ is also provided with a notch or recess $c^2$, in which rests the lower end of the long arm $k^3$ of the cross-lever, passing through the opening $o'$ in the arm $p$. Further, a spiral spring $f'$, coiled on the spindle $r$, (the force of which spring can be regulated by a screw-nut $r'$,) presses the slide P constantly against the side W of the frame, and the propeller $v$ is thereby held in a slot $b$ of the side wall W.

In order to clearly explain the mode of working of the propelling apparatus, the positions shown in Figs. 1 and 2 of the annexed drawings will be taken as a starting-point. In this position the propeller $v$ emerges from the opening $b$ in the side W of the case, and its points penetrate the board B. Now, if the lever H is raised, the part $h'$ sinks until it presses on the set-screw $s'$. At the same time the set-screw $s^2$ descends upon the cross-arm $k'$, the cross-lever moves on pivot $z$ to the right, and the cross-arm $k^3$ pushes the lever-arm $c'$ forward to the right in the direction of arrow 3, whereby a movement of the elbow-lever $c\ c'$ on its pivot takes place, pushing forward the slide P and with it the propeller $v$ in the direction of the arrow 4. (See Fig. 5, view from below, and Fig. 4.) By this forward movement the propeller $v$ pushes the board B forward, sliding against and along pins $a$, and with it the article to be sliced resting thereon. On the lowering of the knife the set-screw $s^3$ presses on the arm $k^2$ of the cross-lever K, the cross-lever swings to the left, and the arm $k^3$ carries then with it the arm $p$, (as well as the parts P and $v$,) and the propeller-rod releases the plate. (See Fig. 6, view from below.) When the knife is again raised, the apparatus returns to positions shown in Figs. 2 and 5; when lowered, to that shown in Fig. 6; and the process is repeated continually by the raising and lowering of the knife, so that by each raising of the knife the board B is pushed forward a space equal to the forward movement of the propeller $v$ in the slot $b$ from the position in Fig. 2 to that in Fig. 5.

If the board B is too long, owing to the articles laid thereon for slicing, it may be supported on guide-rollers E, Figs. 1 and 3, which are fixed on both sides of the machine by rods Q, which, if not required to be used, being movable on the pivot $n$, may be folded up against the side of the machine. In Fig. 1 one of said rods and rollers are shown in the latter position, while in Fig. 3 the other rod and roller are shown in position in line with the board and ready for use.

Having now particularly described my invention, what I claim as new, and desire to secure by Letters Patent, is—

1. The combination, with an oscillating knife and a transversely-movable board, of a longitudinally-movable and oscillating rod situated at right angles to and having means for engaging the edge of the board, a connection between the knife and said rod which moves the latter longitudinally, and connections between said rod and the knife, whereby the movement of the latter oscillates the rod in planes parallel with the board, substantially as set forth.

2. The combination, with the knife-lever and the board movable transversely to the knife, of the propeller-rod adapted to engage the board and having the slot-connections between said rod and the knife, whereby the movement of the latter reciprocates said rod, the elbow-lever $c\ c'$, connected with said propeller-rod, and a part actuated by the knife-lever and engaging one arm of the elbow-lever, substantially as set forth.

3. In means for operating the chopping-board of a machine of the character herein described, the combination, with the slide P, rod $v$, connected thereto, rod $p$, elbow-lever $c\ c'$, and connections between said rods and lever, of cross-lever K, having arms $k'\ k^2\ k^3$, screws $s^2\ s^3$, which operate upon arms $k'\ k^2$ and cause arm $k^3$, the latter of which engages said rod $p$ and elbow-lever, to actuate rod $p$ and lever $c\ c'$, substantially as set forth.

4. In a slicing or chopping machine, the combination, with the board B, of adjustable spring-guides $a\ a$, guide-rollers E, and movable rods Q, carrying said rollers, whereby the board B is kept in a straight course and supported, substantially as set forth.

In witness whereof I have hereunto set my hand in the presence of two subscribing witnesses.

JAN VRÁTIL.

Witnesses:
 FRITZ RENGEY,
 FRIED. FRIESE.